United States Patent Office 3,334,561
Patented Aug. 8, 1967

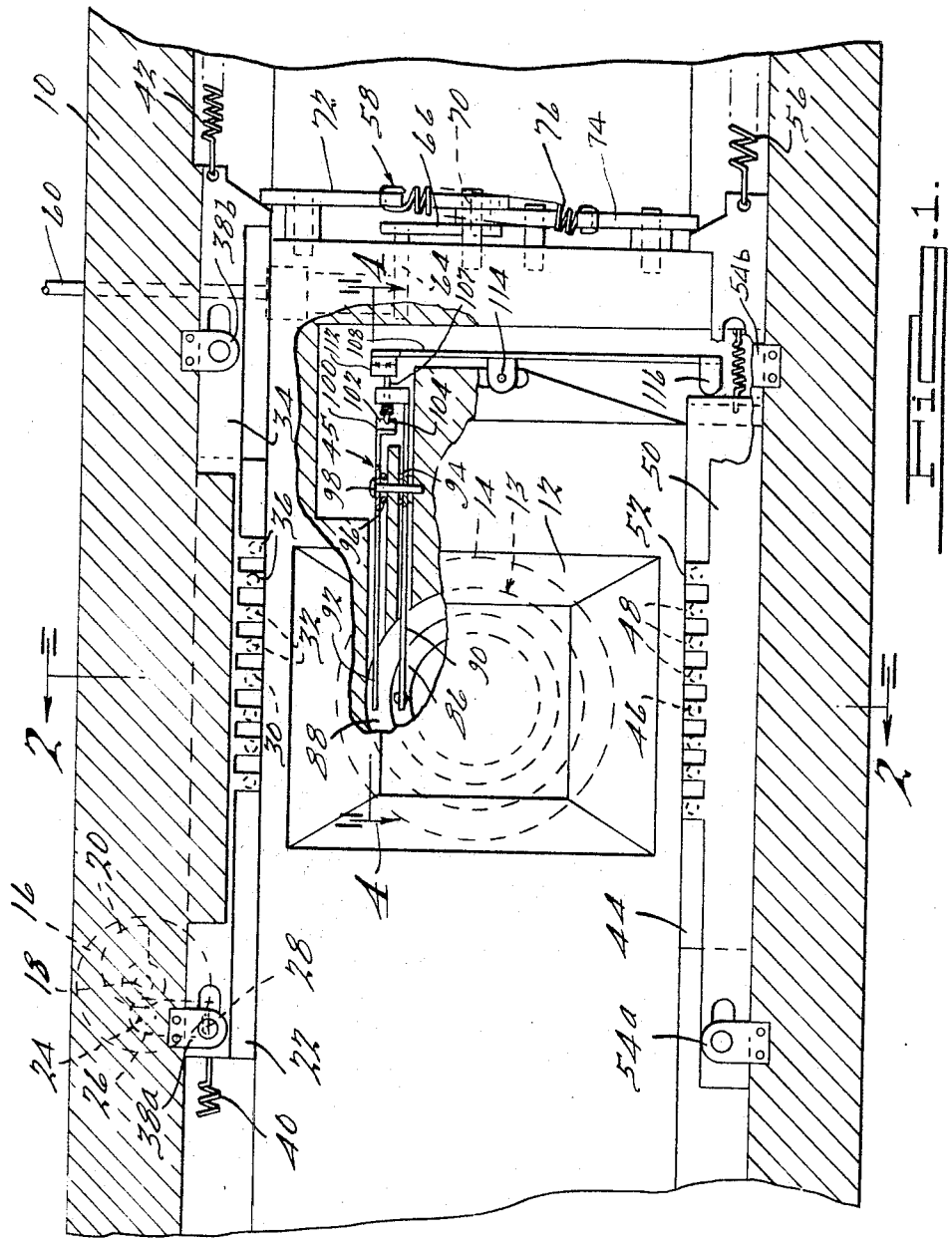

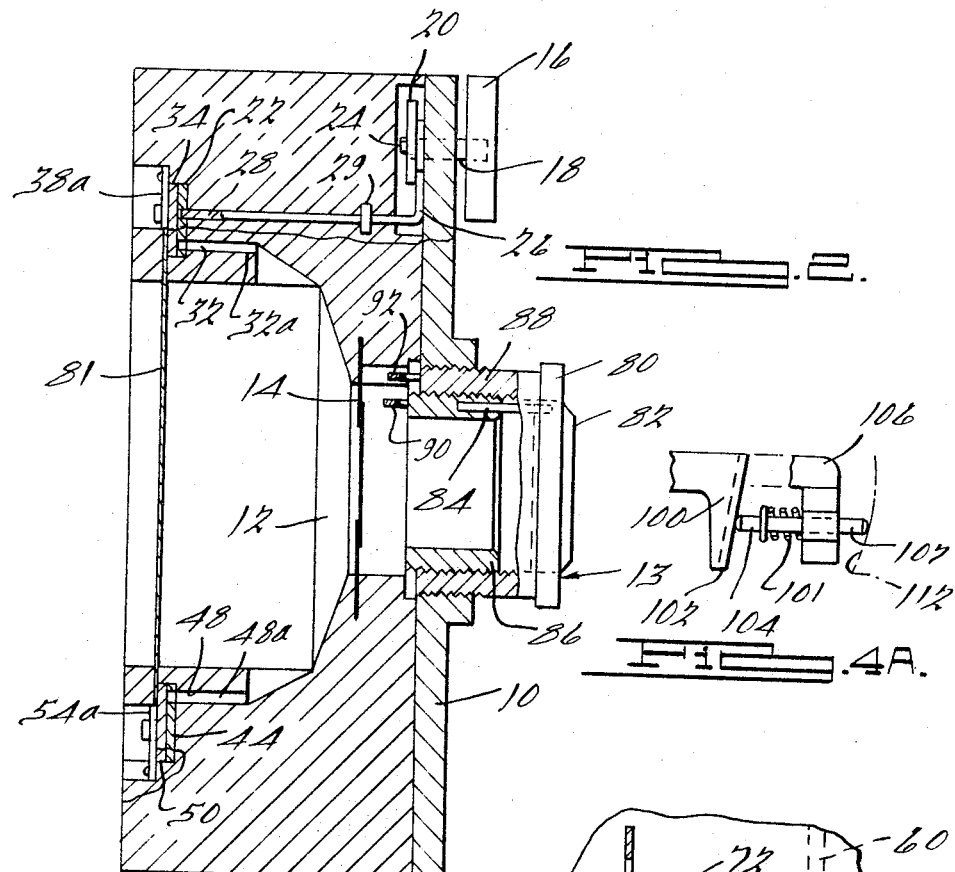

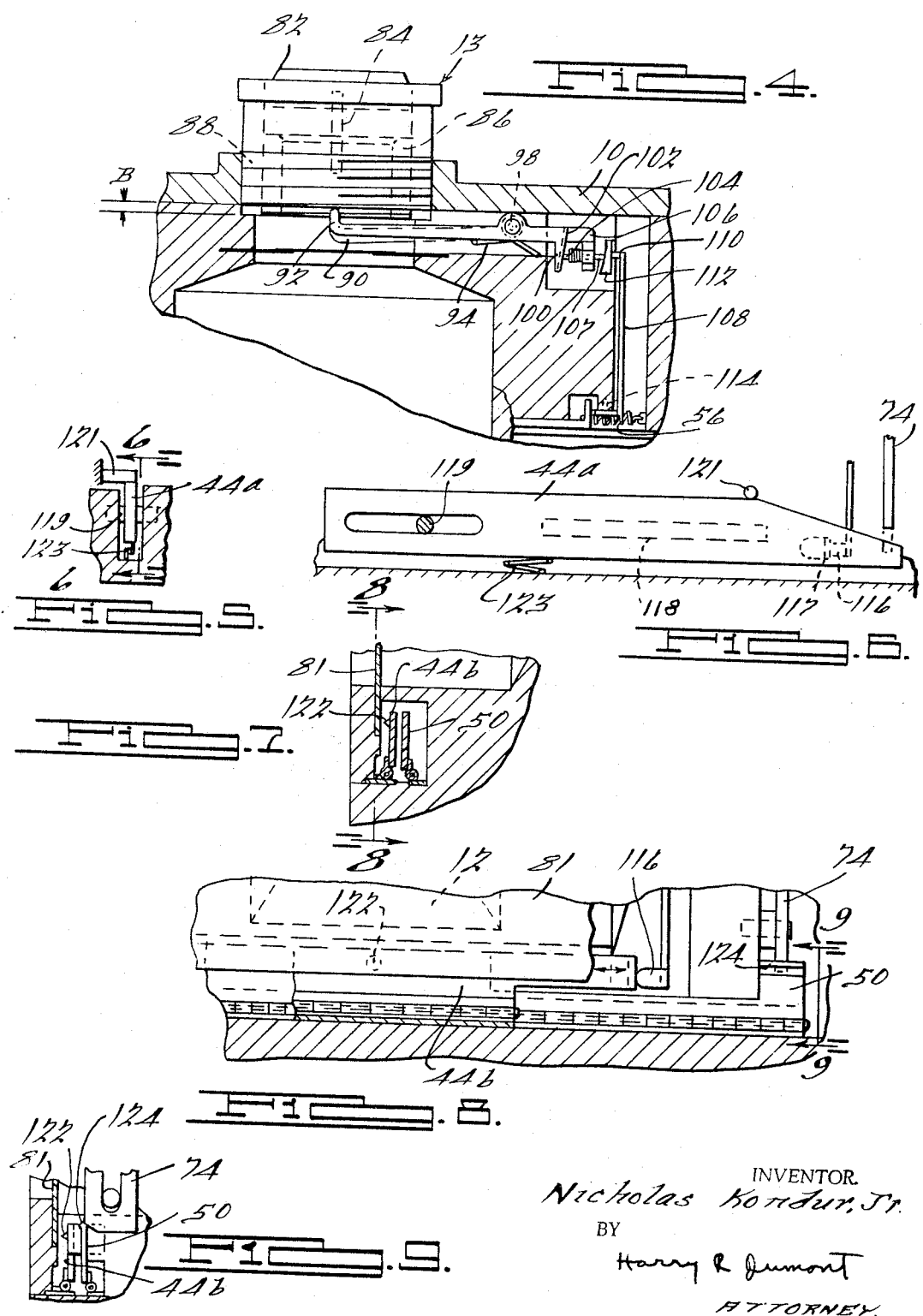

3,334,561
PHOTOGRAPHIC APPARATUS
Nicholas Kondur, Jr., 1003 Hawthorne,
Ypsilanti, Mich. 48197
Filed June 15, 1964, Ser. No. 375,250
2 Claims. (Cl. 95—1.1)

This invention relates generally to photographic apparatus and, more particularly, to an apparatus for registering on the film element indicia representative of preset camera exposure characteristics.

A problem encountered by both professional and amateur photographers is the determination after film development exactly which camera settings were used for each individual exposure. Without this information, improvement and attainment of desired photographic effects in specific environments is often difficult.

It is an object of this invention to provide an improved photographic apparatus for recording such information as lens opening size and speed of exposure on the film during the normal cyclical operation of the camera.

It is an additional object of this invention to record camera preset exposure characteristics such as lens opening size and speed of exposure in separate indicia on the film in such a form that it is readily accessible subsequent to the film development process.

It is a further object of this invention to provide a film transparency holder suitably preprinted to provide a ready and convenient index of a marking previously recorded on the film, which marking is representative of preset exposure characteristics.

In addition to the foregoing objects, other objects and advantages will become apparent from the embodiments of the invention, which, by way of example, are set forth in the accompanying drawings, in which:

FIGURE 1 is a partial view of the camera with rear cover removed and, in part, broken away to best illustrate certain features of the invention;

FIGURE 2 is a partial cross-sectional view along the line 2—2 of FIGURE 1;

FIGURE 3 is an elevational view of the shutter operator mechanism;

FIGURE 4 is a plan view in partial section taken along the line 4—4 of FIGURE 1 showing the lens assembly and associated mechanism for sensing lens aperture opening setting;

FIGURE 4a shows a detail of FIGURE 4;

FIGURES 5 and 6 are views similar to FIGURE 1 showing one alternate embodiment of film marking apparatus with FIGURE 6 taken along the line 6—6 of FIGURE 5;

FIGURES 7–9 show an additional embodiment of the film marking apparatus; FIGURE 8 is taken along the line 8—8 of FIGURE 7; FIGURE 9 is taken along the line 9—9 of FIGURE 8; and FIGURE 10 illustrates a marked film transparency and holder therefor.

FIGURE 1 shows the camera with rear cover and film removed. The various parts and apparatus related to speed setting or "shutter open time" of the camera and its recording on the film are located proximate the upper portion of case 10. The apparatus related to lens opening size setting and its recording is located proximate the lower portion of case 10. The central opening 12 is adapted to hold a lens assembly 13 forwardly of shutter 14 as indicated in dotted line. Lens assembly 13 will be further shown and described in connection with FIGURES 2 and 4, hereinafter. The speed of operation of the camera is adjustable by means well known in the art including an adjustable knob 16 and scale providing a plurality of graduated settings ranging, for example, between 10 and 500 in which the number is representative of the time of exposure desired in units of fractional seconds such as one tenth, one five hundredth and the like. The time setting knob 16 may be operatively connected through a variety of coupling arrangements, not shown, to shutter 14. This feature is not illustrated since it is well known in the camera art. Reference is hereby made to the Model C–3 camera manufactured and sold by Argus Camera, Incorporated of Ann Arbor, Michigan as being one particularly suitable for incorporation of the present invention. Shutter 14 is operated by its associated mechanism in the normal cyclical operation of the camera. Knob 16 has attached to its stem 18 a cam 20 for the purpose of transmitting a selective degree of movement to a speed code slide 22. Speed code slide 22 is differentially positionable to one of eight position time settings by the action of cam 20 against pin 24 carried on drive lever 26. Drive lever 26 is pivotably supported on pin 29 and is drivingly coupled to speed code slide 22 by a drive bail 28 and mating slot connection formed in slide 22. Speed code slide 22 is preferably supported in a recess formed in case 10 for sliding movement leftwardly or rightwardly as will be more clearly shown in FIGURE 2, hereinafter. Code slide 22 is further formed with a single cutout portion indicated by numeral 30, which cutout portion is effective to uncover selectively one of eight equally spaced apertures 32 formed through the upper rear portion of camera casing 10. Each aperture 32 is in communication with light admitted through the opening of shutter 14 in each cycle of operation of the camera. To admit light through the selectively uncovered one of apertures 32, an auxiliary code slide 34 is mounted outwardly from speed code slide 22 and has formed thereon eight downwardly extending projections 36, each conforming in width and spacing to the width of cut-out portion 30 of speed code slide 22. Auxiliary code slide 34 is slidably supported in pin and slot relationship at both ends by hangers 38a and 38b. Slides 22 and 34 are each maintained in their normal position by the action of biasing springs 40 and 42, respectively.

Located proximate the lower and rearward portion of case 10 is the apparatus related to lens opening settling and its recording. A pair of slides 44 and 50 are utilized which correspond basically in structure and mode of operation to slides 22 and 34 hereinbefore described. Slide 44 is the lens code slide and provides a single cut-out portion 46 alignable with one of a plurality of apertures 48, each of which communicates with light admitted to the camera upon the operation of shutter 14. Auxiliary code slide 50 has formed thereon eight upwardly extending and equally spaced projections 52. Lens code slide 44 is supported for sliding movement leftwardly or rightwardly in response to a lens opening sensing mechanism indicated generally by the numeral 45 operable in connection with lens assembly 13 in a manner which will be described in connection with FIGURES 4 and 4a hereinafter. Auxiliary code slide 50 is supported for a limited but discrete degree of longitudinal movement by a pin and slot connection furnished by members 54a and 54b. Biasing spring 56 is utilized to maintain auxilary code slide 50 in its normal right hand position while a similar biasing means, not shown, is operatively connected to the left hand end of lens code slide 44.

A common operating mechanism such as shutter operator mechanism 58 is used in every cycle of operation of the camera as a means to operate the auxiliary code slides 34 and 50. Reference is now made to FIGURE 3 as further clarifying the showing of FIGURE 1. Included in shutter operating mechanism 58 is a plunger stem 60 having its lower end 62 in abutment with a pin 64 extending sidewardly from the upper arm of bell crank 66. Bell crank 66 is supported for rotative movement about a pin 68 and further has a second pin 70 laterally extending from its lower arm. A pair of symmetrical drive slides 72 and 74 are supported side by side for respective upward and downward movement, each having a rightwardly extending lateral projection in engagement with an opposite side of pin 70. Biasing spring 76 is utilized to maintain drive slides 72 and 74 away from driving engagement with their corresponding auxiliary code slides 34 and 50. It will be seen that auxiliary code slides 34 and 50 each have a cam end portion adapted for driven engagement with its corresponding drive slide 72 or 74. Responsive to the depression of shutter plunger 60 in a normal cycle of operation of the camera, bell crank 66 will rock clockwise about its pivot 68 whereby, by reason of the action of pin 70 against the lateral projections of drive slides 72, 74, these slides will be driven apart in respective upward and downward directions. Therefore, auxiliary code slides 34 and 50 will each be given a discrete leftward movement in each cycle of operation of the camera, that movement being substantially equal to the width of and the spacing between tooth projections 36 and 52 on those slides.

FIGURE 2 further shows the lens assembly as indicated by the numeral 13. The forward face 80 of lens assembly 13 has imprinted thereon the various aperture sizes which may be as follows: 3.5, 4, 5.6, 8, 11, 16, 20 and 22. This provides a visual guide to the selective setting of the lens diaphragm or aperture to the desired size by means of a selector 82. This feature is not illustrated since it is well known in the camera art. It should be noted that upper apertures 32 and lower apertures 48 are selectively uncovered to expose indicia i.e. circular marks on the film 81. The marks are preferably located on opposing margins of the film 81 for reasons which will, in view of later discussion, become apparent. Under normal or daylight conditions, the amount of light admitted to the camera through shutter 14 into central portion 12 is sufficient to expose marks of the desired degree of distinctness through apertures 32 and 48. Since under marginal brightness conditions this may not be sufficient, a coating of any appropriate light emissive substance 32a, 48a may be applied to the interior surface of each aperture as shown to improve the quality of the marking.

FIGURE 4 taken in connection with FIGURE 1 shows the mechanism utilized to selectively position lens code slide 44 in accordance with the presetting of selector 82. The detail of the lenses, their mountings and other interior components of lens assembly 13 has been omitted in the interest of simplification and because it is not pertinent to the present invention. It will be understood that lens assembly 13 contains one or more lenses and is differentially positionable forwardly and rearwardly relative to the camera casing 10. Selector 82 is rotatable manually to its selective lens opening position. A drive pin 84 is coupled between selector 82 and a hollow sensor block 86 shown in its forwardmost position. Sensor block 86 is provided with an external threaded portion threadably engageable with an internal threaded projection 88 of lens assembly 13. Responsive to the rotation of selector 82 to a selected lens opening position, sensor block 86 is movable rearwardly to any one of a plurality of positions. The dimension B as indicated by arrow is thus varied by rotation of the sensor block 86 with respect to lens assembly 13. A suitable mechanism is provided for sensing the size of dimension B which in turn is representative of the setting of lens opening selector 82. The sensing mechanism comprises a pair of sensing levers 90 and 92. Lever 90 is biased into yieldable engagement with the rearward surface of sensor block 86 by a biasing spring 94. Lever 92 is similarly biased into yieldable engagement with the rearward surface of the projection 88 of lens assembly 13 by a biasing spring 96. Both levers 90 and 92 are movable relative to each other about a common mounting pivot point provided by stud 98. Lever 92 has an upwardly bent lower end portion 100 with a uniformly inclined cam surface 102. Lever 90 carries a stud 104 movably mounted on its lower arm 106. Pin 104 is spring loaded through spring 101 and engaged with cam surface 102 so that the relative movement of sensor block 86 to lens assembly 13 is reflected in the movement of lever 90 relative to lever 92. A means is further provided for transmitting this movement to lens code slide 44 which means comprises a driver bail 108. Reference is hereby made to FIGURE 1 for a more complete showing of driver bail 108. Driver bail 108 is formed with an upper arm 110 having a radial cam surface 112. Radial cam surface 112 is engageable with the end 107 of pin 104. Driver bail 108 is pivoted responsive to the action of righthand end 107 of pin 104 against cam surface 112. The radial configuration of cam surface 112 is provided to compensate for the radial displacement of lever 90 relative to lever 92. Driver bail 108 is pivotably supported about a fulcrum proximate its upper end provided by stud 114. Driver bail 108 further has a lower foot 116 leftwardly extending into driving engagement with the right hand end of lens code slide 44.

FIGURES 5 and 6 illustrate an alternate embodiment of the present invention equally applicable to both speed code slide and lens opening code slide to provide a single mark on the film with a length representative of the selective setting of preset speed or lens. In this embodiment, camera casing 10 is provided with a rectangular opening 118 in communication with the central portion 12 of the camera and light admitted thereto during shutter operation. Auxiliary code slide 44a is modified to incorporate the function of both slides 44 and 50. Slide 44a is a solid slide shiftably movable to a predetermined position by the action of lower foot 116 against a lateral lug 117 extending from slide 44a. Slide 44a is shiftably movable on stud 119 and maintained in a suitable longitudinal channel by a limiting stud 121. An upward biasing force is provided by leaf spring 123 to maintain slide 44a in an upward direction against stud 121. Slide 44a is rocked about its pivot about stud 119 responsive to the depression of shutter operated slide 74 as hereinbefore described in every cycle of operation of the camera. Depending on the position to which slide 44a has been selectively shifted, rectangular opening 118 will be uncovered and the film will be exposed to receive a triangular marking.

FIGURES 7 through 9 illustrate a still further embodiment of the invention in which a mark representative of speed or lens opening selection is physically punched into the film without reliance upon light exposure. Code slide 44b is modified to provide a solid slide bearing a single pointed punch element 122. Opening code slide 44b is similarly differentially positionable to a preset selective position in the manner previously indicated for slide 44. Auxiliary code slide 50 is positioned forwardly of slide 44b and both slides are pivotally supported about their lower edges as shown. Responsive to the movement of driver slide 74 on its end cam surface 124, auxiliary slide 50 serves to rock speed code slide 44b as indicated to punch a mark in the film 81 at an appropriate position indicative of the speed setting.

FIGURE 10 illustrates a film element 81 such as a developed film transparency appropriately mounted on a film holder 126. Film 81 has been provided with an indicia 123 near one margin representative of speed setting of the film exposure and further has been provided with an indicia 125 near the opposing margin representative of lens opening setting of the film exposure. Holder 126 has rectangular cut-out margin portions 128 and 130 and a central cut-out portion 132 for the film. Margin cut-out portions 128 and 130 are appropriately pre-printed with data indices corresponding to the original speed and lens settings made on the camera.

*Description of operation*

Preliminary to sighting and operation of the camera, exposure characteristics are preset. This is accomplished by manipulative adjustment of speed setting by selector knob 16 and by adjustment of lens opening by selector 82. With reference to FIGURE 1, it will be seen that speed code slide 22 will be moved rightwardly to uncover one of apertures 32 with its cut-out portion 30 preparatory to marking. The particular aperture 32 uncovered will correspond to one of the eight selective settings provided for speed setting. It should be noted that auxiliary code slide 34 remains in its unmoved righthand position masking cut-out portion 30 of speed code slide 22. A setting of lens opening is made by selector 82, as is shown by FIGURES 1, 4, and 5. This setting provides relative movement between lens assembly 13 and sensor block 86 which movement is responded to be sensing levers 90 and 92. Driver bail 108 is then pivoted in a clockwise manner about stud 114 responsive to the engagement of its upper cam surface 112 by end 107 of pin 104. Lower foot 116 of driver bail 108 selectively positions lens opening code slide 44 to uncover one of apertures 48 with its cut-out portion 46. Auxiliary code slide 50 maintains all apertures 48 masked by its projections 52.

Initiation of a cycle of operation of the camera is accomplished by shutter operator mechanism 58. Upon depression of plunger stem 60, as is shown in FIGURES 1 and 3, drive slide 72 is driven upwardly and drive slide 74 is driven downwardly. This provides a leftward movement of auxiliary code slides 34 and 50 to uncover momentarily the preselected apertures 32 and 48. A mark is thus provided proximate the upper margin of the film 81 which is exposed thereupon indicative of the speed preset for the exposure. At the same time, a mark is exposed proximate the lower margin of the film 81 which is indicative by its selective positioning thereupon of the lens opening setting selected.

The illustrative embodiment of the present invention is directed toward marking of indicia representative of exposure speed and lens opening setting but the invention is not intended to be so limited. The present invention is readily applicable to any characteristic exposure setting made and its manner of recording on the film, and might further include range setting, a combined function representative of speed and opening, and the like.

The alternate embodiments illustrated in FIGURES 6 and 8 differ only in the specific type of mark applied to the film. In the case of FIGURE 6, the mark is an exposed triangular mark whose size, or more specifically, its length is representative of the setting made. In the case of FIGURE 8, the marking made is not of light exposure dependence and comprises a puncture physically made through the film. In all cases, it will be seen that the indicia used, however applied and constituted, is adapted to indicate by its position on the film a particular exposure setting characteristic.

FIGURE 10 shows the film as finally mounted, in the present instance as a transparency, in a frame mount or holder particularly suitable for insertion in a film projector. By uniform preprinting of the mount as hereinbefore described, the desired preset exposure characteristics are readily available as a valuable reference by the photographer.

It will thus become apparent that, by the present invention, I have provided a novel and improved photographic apparatus and method whereby exposure characteristics are reliably marked on the film itself and provision is made for a permanent and readily accessible record of those characteristics.

I claim, as my invention:

1. A film holder comprising a frame having a central cut-out portion for retaining in place an exposed film and at least one preprinted and cut-out margin portion including a scale alignable with indicia on the film for indicating camera setting data by the location of said indicia relative to said scale.

2. A film holder comprising a frame having a central cut-out portion for retaining in place an exposed film, a first preprinted margin portion including a first scale alignable with a first indicia on the film for indicating camera aperture opening size by the location of said first indicia relative to said first scale and a second preprinted margin portion including a second scale alignable with a second indicia on the film for indicating camera aperture opening time by the location of said second indicia relative to said second scale.

References Cited

UNITED STATES PATENTS

| 1,358,990 | 11/1920 | Scannell | 95—1.1 |
| 1,731,198 | 10/1929 | Kawatch | 95—1.1 |
| 1,886,053 | 11/1932 | Scannell | 95—1.1 |
| 2,210,090 | 8/1940 | Lutz | 95—1.1 |

FOREIGN PATENTS

| 957,608 | 8/1949 | France. |
| 672,033 | 2/1939 | Germany. |

JOHN M. HORAN, *Primary Examiner.*